(12) United States Patent
Yamakage (10) Patent No.: US 7,647,167 B2
(45) Date of Patent: Jan. 12, 2010

(54) NAVIGATION SYSTEM, ROUTE SEARCH METHOD, AND STORAGE MEDIUM

(75) Inventor: Iwao Yamakage, Iwaki (JP)

(73) Assignee: Apline Electronics, Inc., Tokyo (JP)

( * ) Notice: Subject to any disclaimer, the term of this patent is extended or adjusted under 35 U.S.C. 154(b) by 708 days.

(21) Appl. No.: 11/406,052

(22) Filed: Apr. 18, 2006

(65) Prior Publication Data
US 2006/0259235 A1 Nov. 16, 2006

(30) Foreign Application Priority Data
May 16, 2005 (JP) .............................. 2005-142128

(51) Int. Cl.
*G01C 21/30* (2006.01)

(52) U.S. Cl. .................. 701/208; 701/200; 701/207; 701/209; 701/300; 340/995.1; 340/995.14; 340/995.19; 340/995.23

(58) Field of Classification Search ................ 701/208, 701/200, 207, 209, 300
See application file for complete search history.

(56) References Cited

U.S. PATENT DOCUMENTS

| | | | | |
|---|---|---|---|---|
| 5,635,953 A * | 6/1997 | Hayami et al. | ............... | 715/855 |
| 5,887,269 A * | 3/1999 | Brunts et al. | ................ | 701/208 |
| 6,029,069 A * | 2/2000 | Takaki | ..................... | 455/456.1 |
| 6,064,941 A * | 5/2000 | Nimura et al. | ............... | 701/210 |
| 6,560,530 B1 * | 5/2003 | Yamada et al. | ............... | 701/208 |
| 6,687,605 B1 * | 2/2004 | Wako | ......................... | 701/201 |
| 6,735,516 B1 * | 5/2004 | Manson | ..................... | 701/209 |
| 7,143,090 B2 * | 11/2006 | Spalink et al. | ................. | 707/5 |
| 7,184,885 B2 * | 2/2007 | Watanabe | .................... | 701/201 |
| 7,342,516 B2 * | 3/2008 | Kato et al. | ............ | 340/995.19 |
| 2004/0162088 A1 * | 8/2004 | Taniwaki | .................. | 455/456.1 |
| 2004/0203932 A1 * | 10/2004 | Yamagishi et al. | .......... | 455/457 |
| 2004/0267443 A1 * | 12/2004 | Watanabe | .................... | 701/201 |
| 2005/0033509 A1 * | 2/2005 | Clapper | ..................... | 701/201 |
| 2005/0154720 A1 * | 7/2005 | Kurosawa et al. | ............. | 707/3 |
| 2006/0241854 A1 * | 10/2006 | Tu et al. | ..................... | 701/202 |

* cited by examiner

*Primary Examiner*—Khoi Tran
*Assistant Examiner*—Jonathan Sample
(74) *Attorney, Agent, or Firm*—Brinks Hofer Gilson & Lione (57) ABSTRACT

There are provided a navigation system, a route search method and a storage medium which are easily capable of setting a destination even if a telephone number, which is not contained in a storage device, is entered. A route search processing unit, in the case where, for example, positions corresponding to telephone numbers that match the number expressing the area of the entered telephone number are four or more, selects four telephone numbers that are approximate to the entered telephone number, and sets the point of intersection, which is formed when the positions corresponding to the selected telephone numbers are connected diagonally by straight lines, as a destination. The route search processing unit searches for a route from the position of a user's car, which is calculated by a vehicle position measuring unit, to a point that is set as a destination.

19 Claims, 9 Drawing Sheets

NAVIGATION SYSTEM, ROUTE SEARCH METHOD, AND STORAGE MEDIUM

BACKGROUND OF THE INVENTION

1. Field of the Invention

The present invention relates to a navigation system, a route search method, and a storage medium.

2. Description of the Related Art

A navigation system equipped with a map display function includes a route search function to search for a route of the shortest distance from a present position to a destination or a route of the shortest time considering dynamic traffic information. There exists a plurality of conventional methods for setting the destination that is initially set in a route search.

The first conventional method is a method in which a user operates a map displayed on a display to directly specify the position of a destination on the map. This method is effective when the user understands the local geography around the destination to an extent. However, if the user is not familiar with the local geography around the destination, he/she needs to zoom in, zoom out, and scroll the map frequently to search for the specific position of the destination, and the method has a drawback that much time is spent in destination setting.

The second conventional method is a method of directly setting a destination, where the position of a destination is determined, for example, from a telephone number associated with the destination (hereinafter, this method will be called a telephone number input method).

In the telephone number input method, the user enters a telephone number through an input means such as a touch panel provided on the navigation system. A storage device such as a CD-ROM or a DVD-ROM provided in the navigation system stores telephone numbers, positional information where the telephone numbers exist, name information, facility information, address information, message, image and the like which are attribute information of telephone numbers (hereinafter, such information will be called guidance information), and the relationship between area codes/local office numbers and representative positional information of an area covered by the office numbers.

Next, the guidance information is searched based on the telephone number that the user enters. Herein, when a telephone number that matches the telephone number entered by the user is stored as the guidance information, the position of a destination is determined by reading out the positional information in the guidance information.

On the other hand, if a telephone number that matches the telephone number that the user entered is not stored, the representative positional information of an area covered by the area code/local office number associated with the telephone number is searched. Further, a map of the area around the representative position is displayed on a screen, and the user scrolls the map to determine the position of the destination.

By using such a telephone number input method, the destination can be directly set only if the telephone number of the destination is available. Further, there exists a system disclosed in Japanese Patent Publication No. 7-60479 as such a navigation system.

However, since the navigation system disclosed in Japanese Patent Publication No. 7-60479 is designed such that a point represented by office numbers (area code+local office number) is displayed as a way of dealing with the case where the entered telephone number is not contained in the storage medium, a point near the point of the entered telephone number is not necessarily displayed. Thus, there existed a problem that the user needed to scroll a map from the displayed point by operating a remote controller to search for a point that appeared to be a desired destination, and longer time was taken to set the destination.

SUMMARY OF THE INVENTION

It is an object of the invention that a destination can be easily set even if a position corresponding to a telephone number that the user enters is not contained in the storage unit.

The above-described object can be achieved by a navigation system that includes: a storage unit that stores map data having a position corresponding to an entered telephone number; and a route search processing unit that, in the case where a position corresponding to the entered telephone number is not stored and positions corresponding to telephone numbers that match a number expressing the area of the entered telephone number are stored, selects a predetermined number of telephone numbers from among the telephone numbers that match the number expressing the area of the entered telephone number, and sets a destination based on one or more positions corresponding to the selected telephone numbers to search a route.

Further, the navigation system may be a system wherein, in the case where positions corresponding to the telephone numbers that match the number expressing the area of the entered telephone number are four or more, the route search processing unit selects four of the telephone numbers and sets the point of intersection, which is formed when the positions corresponding to the selected telephone numbers are connected diagonally by straight lines, as a destination.

Further, the navigation system may be a system wherein, in the case where positions corresponding to the telephone numbers that match the number expressing the area of the entered telephone number are two or more and less than four, the route search processing unit selects two of the telephone numbers and sets a central point, which is formed when the positions corresponding to the selected telephone numbers are connected by a straight line, as a destination.

Furthermore, the navigation system may be a system wherein, in the case where only one telephone number matches the number expressing the area of the entered telephone number, the route search processing unit selects the telephone number and sets a position corresponding to the selected telephone number as a destination.

Further, the navigation system may be a system that includes a display unit that displays a cursor, which indicates a predetermined range including a destination set by the route search processing unit, on the map data.

Further, the navigation system may be a system wherein the selected telephone numbers are telephone numbers approximate to the entered telephone number.

Further, the navigation system may be a system wherein, in the case where a set destination is an inappropriate point, the route search processing unit resets a nearby appropriate point as a destination.

Furthermore, the navigation system may be a system wherein the inappropriate point is an inaccessible point.

Further, the navigation system may be a system wherein the numbers expressing the area are office numbers.

Still further, the above-described object can be achieved by a route search method that includes the steps of: storing map data having a position corresponding to an entered telephone number; and selecting a predetermined number of telephone numbers from among telephone numbers that match a number expressing the area of the entered telephone number in the case where a position corresponding to the entered telephone number is not stored and positions corresponding to the telephone numbers that match the number expressing the area of the entered telephone number are stored, and setting a destination based on one or more positions corresponding to the selected telephone numbers to search for a route.

Further, the route search method may be a route search method wherein, in the case where positions corresponding to the telephone numbers that match the number expressing the area of the entered telephone number are four or more, four of the telephone numbers are selected, and the point of intersection, which is formed when the positions corresponding to the selected telephone numbers are connected diagonally by straight lines, is set as a destination.

Further, the route search method may be a route search method wherein, in the case where positions corresponding to the telephone numbers that match the number expressing the area of the entered telephone number are two or more and less than four, two of the telephone numbers are selected, and a central point, which is formed when the positions corresponding to the selected telephone numbers are connected by a straight line, is set as a destination.

Further, the route search method may be a route search method wherein, in the case where only one telephone number matches the number expressing the area of the entered telephone number, the telephone number is selected and a position corresponding to the selected telephone number is set as a destination.

Further, the route search method may be a route search method that includes the step of displaying a cursor, which indicates a predetermined range including a destination set by the route search method, on the map data.

Furthermore, the route search method may be a route search method wherein the selected telephone numbers are approximate telephone numbers to the entered telephone number.

Further, the route search method may be a route search method wherein, in the case where a set destination is an inappropriate point, the route search processing unit resets a nearby appropriate point as a destination.

Further, the route search method may be a route search method wherein the inappropriate point is an inaccessible point.

Furthermore, the route search method may be a route search method wherein numbers expressing the area are office numbers.

Still further, the above-described object can be achieved by a computer-readable storage medium storing a program for executing the route search method therein.

DESCRIPTION OF THE PREFERRED EMBODIMENTS

In the following, the best mode for implementing the present invention will be described with reference to the drawings.

Figure 1:
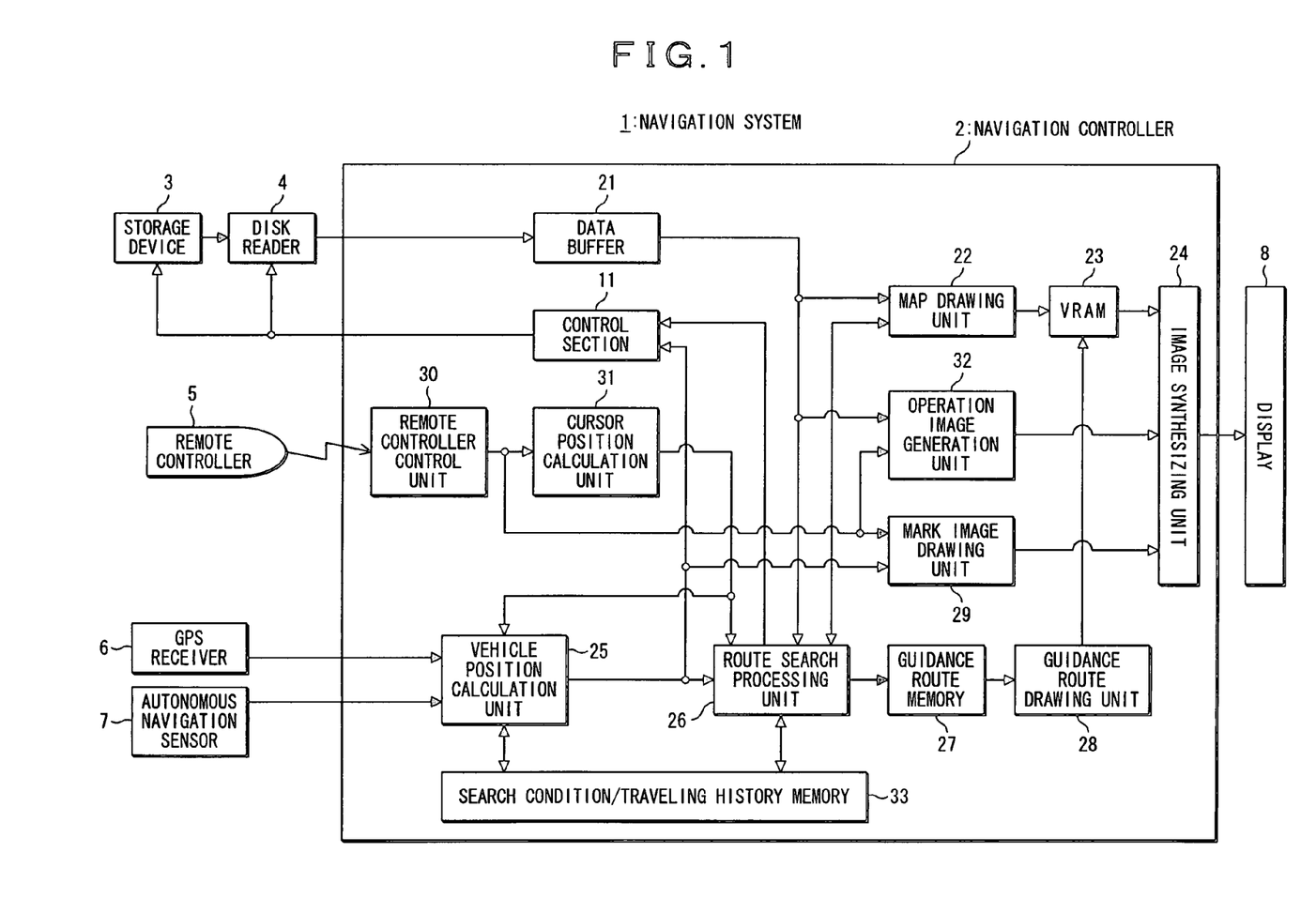
FIG. 1 is a block diagram of a navigation system 1.

FIG. 1 is the block diagram of the navigation system 1. As shown in FIG. 1, the navigation system 1 includes a navigation controller 2, a storage device 3 (storage unit), a disk reader 4, a remote controller 5, a GPS receiver 6, an autonomous navigation sensor 7, and a display 8 (display unit). The navigation system 1 includes a function of performing a route search to a set destination and displaying a guidance route corresponding to the search result.

Figure 2:
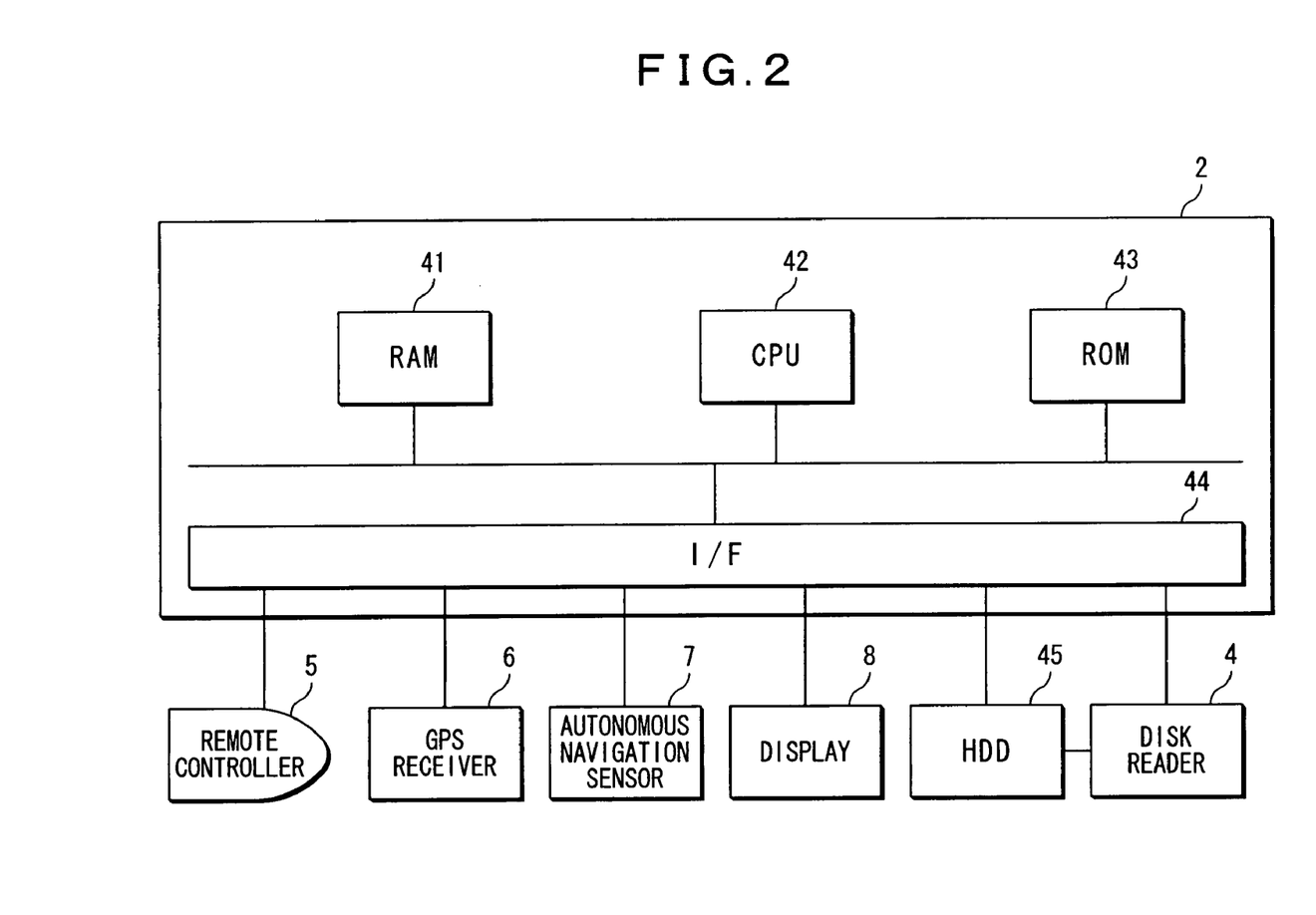
FIG. 2 is a hardware constitution diagram of the navigation system 1.

FIG. 2 is the hardware constitution diagram of the navigation system 1. The navigation controller 2 includes a CPU (Central Processing Unit) 42, a ROM (Read Only Memory) 43, a RAM (Random Access Memory) 41, and an I/F (interface) 44, and controls the entire navigation system 1.

The storage device 3 may be an HDD (Hard Disk Drive) 45, and stores a map data file containing map information, for example, an intersection data file storing information on intersections, a road data file storing information on roads such as road types and origin/ending point of each road, a node data file storing East longitude/North latitude coordinates at one point of the road, and a guidance point data file storing positional coordinates of typical facilities corresponding to purpose of use, which is classified into genres of gas station, convenience store and the like, and guidance information on the facilities which is necessary for route guidance.

The storage device 3 also stores guidance information where telephone numbers are associated with positional information, names, addresses, facility types, messages, image data and the like corresponding to the telephone numbers, and local office number area information where area codes/local office numbers, rough positional information of areas in which the area codes/local office numbers are located, and area codes indicating prefectures and communities are associated. Note that the storage device 3 may include a DVD-RW (DVD Rewritable).

Further, the storage device 3 stores map data of a hierarchical structure and stores data for route searching, which is hierarchical from a lower level having a large amount of road network information to a high level having a small amount of road network information.

The disk reader 4 reads out data stored in the storage device 3.

The remote controller 5 is a device with which a user enters various instructions, and includes various operation keys such as a search key for providing a route search instruction, a route guidance mode key used in setting a route guidance mode, a destination input key, vertical and horizontal cursor keys, map zoom-down/zoom-up keys, and a setting key for selecting an item located under a cursor on a display screen. The user can enter information necessary for setting a destination such as a departure point and a passage point by operating the remote controller 5. Furthermore, the user can set a destination such as a departure point and a passage point by entering an address, a telephone number, coordinates or the like by using the remote controller 5.

The GPS receiver 6 receives radio waves sent from a plurality of GPS satellites, performs three-dimensional positioning processing or two-dimensional positioning processing to calculate the absolute position and bearing of a vehicle, and provides them together with a positioning time.

The autonomous navigation sensor 7 includes an angle sensor such as a vibration gyro that detects a vehicle rotation angle as a relative bearing and a distance sensor that produces one pulse per a predetermined traveling distance, and calculates the relative position and bearing of the vehicle.

The display 8 is a liquid crystal display or the like, and displays a map image of the area around a user's vehicle, a vehicle position mark, a departure point mark, a destination mark, guidance route, a destination-set screen or the like based on drawing data supplied from the navigation controller 2. Further, the display 8 displays a touch switch corresponding to the display of a function key. The user can set a destination or the like by using the touch switch.

Next, the navigation controller 2 will be described. As shown in FIG. 1, the navigation controller 2 includes a data buffer 21, a map drawing unit 22, a VRAM (Video RAM) 23, an image synthesizing unit 24, a vehicle position calculation unit 25, a route search processing unit 26, a guidance route memory 27, a guidance route drawing unit 28, a mark image drawing unit 29, a remote controller control unit 30, a cursor position calculation unit 31, an operating image generation unit 32, and a search condition/traveling history memory 33.

In the navigation controller 2, the above-described CPU 42 runs a predetermined program from a predetermined storage device on the RAM 41 to realize each function shown in FIG. 1. Note that the predetermined program includes a program within the scope of claims.

The data buffer 21 temporarily stores the map data of the hierarchical structure, which is read out from the storage device 3 by the disk reader 4.

The map drawing section 22 creates map drawing data necessary for display based on the map data stored in the data buffer 21.

The image synthesizing unit 24 performs image synthesis by layering the map drawing data read out from the VRAM 23 and various drawing data obtained from the guidance route drawing unit 28, the mark image drawing unit 29, and the operating image generation unit 32 to provide synthesized drawing data to the display 8.

The vehicle position calculation unit 25 calculates the position of the user's vehicle based on the detection data of the GPS receiver 6 and the autonomous navigation sensor 7. Further, the vehicle position calculation unit 25 stores the position of the user's vehicle in the search condition/traveling history memory 33 as traveling history while associating it to time information.

The route search processing unit 26 performs a route search between a set destination and a departure point under a predetermined search condition. When the route search processing unit 26 performs route searching under a search condition directed by the navigation system 1, it searches for a route requiring a minimum cost under a set condition such as the shortest distance or the shortest time, for example.

Furthermore, the route search processing unit 26 performs route searching using a position corresponding to an entered telephone number as a destination, and shows a guidance route corresponding to the search result. Although a description will be made in detail later, if a position corresponding to the entered telephone number is not stored, the route search processing unit 26 sets a destination from positions corresponding to one or more telephone numbers that match a number expressing the area of the entered telephone number, and searches for a route.

The guidance route memory 27 stores data of the guidance route that the route search processing unit 26 finds. The guidance route drawing unit 28 selects guidance route data included in a map area drawn in the VRAM 23 at the current point from the guidance route data stored in the guidance route memory 27, and creates guidance route drawing data for displaying a guidance route on a map image in an overlaid manner. The mark image drawing unit 29 creates drawing data for generating a vehicle position mark at the position of the user's vehicle or generating a cursor mark having a predetermined shape.

The search condition/traveling history memory 33 stores the traveling history of a vehicle from the vehicle position calculation unit 25, the previously set search condition from the route search processing unit 26, the registered contents of the navigation system 1, a user's address, the number of off-route diversions performed, a mark list, the number of traveling tracks, destination history, map search number, highway, regular road, distance, road width, and the like for each predetermined area while they are associated with time information. Here, the predetermined area means an administrative district, a sightseeing course or the like. The information stored in the search condition/traveling history memory 33 is calculated from the route search processing unit 26 based on the registered contents of the navigation system 1, the previously set search condition, the traveling history of a vehicle or the like.

Next, a description will be made for a process in which a destination is set from positions corresponding to one or more telephone numbers that match a number expressing the area of an entered telephone number and a route is searched if the position corresponding to the telephone number entered by the user is not stored in the storage device 3.

Figure 3:
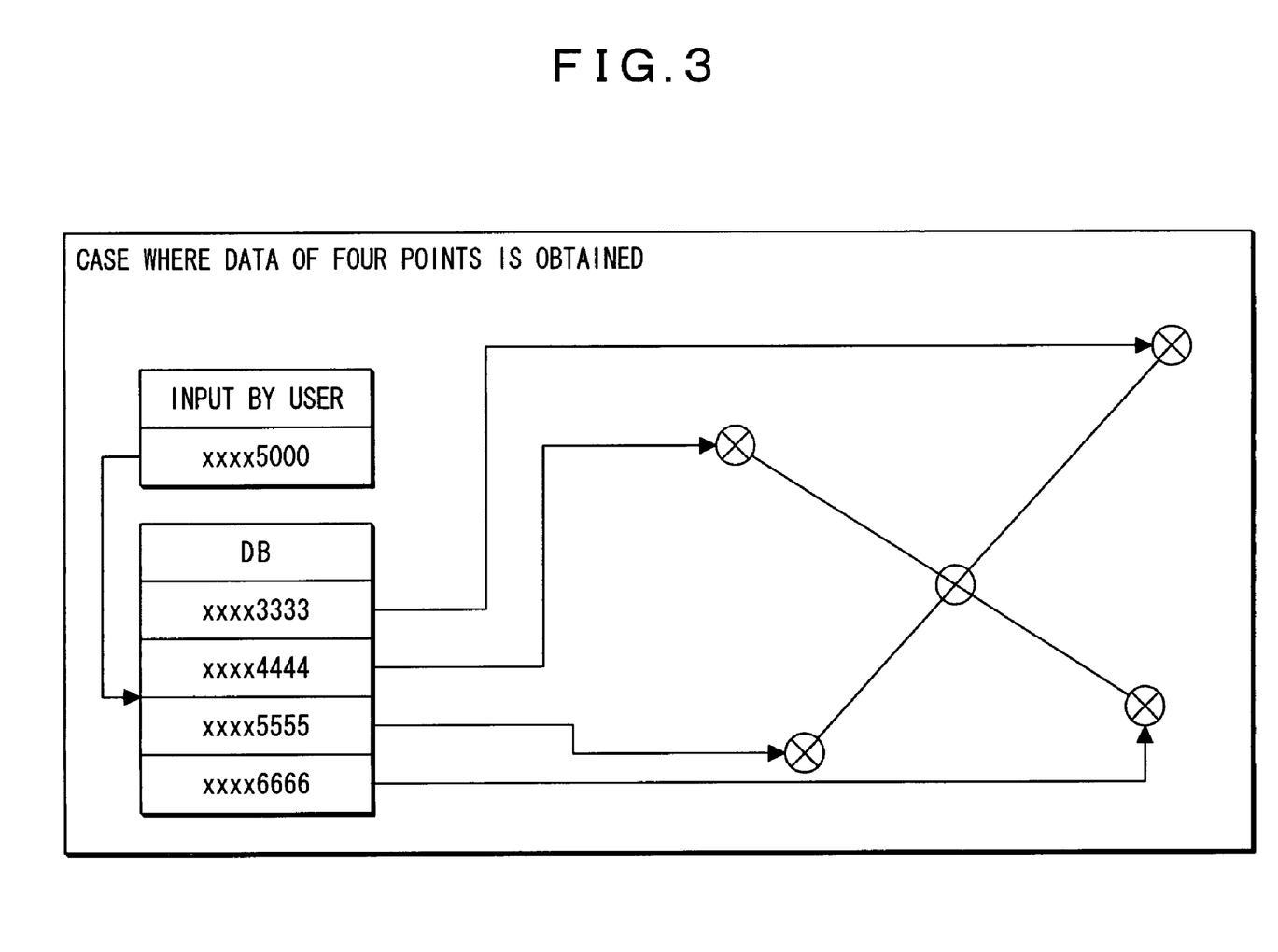
FIG. 3 is an explanatory view of a process of setting a destination for searching a route in the case where positions corresponding to telephone numbers that match a number expressing the area of an entered telephone number are four or more.

FIG. 3 illustrates the process of setting a destination to search a route in the case where a position corresponding to the telephone number of a destination is not stored when the user enters the telephone number and positions corresponding to telephone numbers that match a number expressing the area of the entered telephone number are four or more.

For example, a case is considered in which the user enters the telephone number XXXX5000 by using the remote controller 5. Note that XXXX expresses a local office number and an area code is omitted. The route search processing unit 26 searches for a position corresponding to the entered telephone number from the map data stored in the storage device 3. If a position corresponding to the entered telephone number is not stored in the storage device 3, the processing unit selects four telephone numbers approximate to the telephone number entered by the user out of telephone numbers that match the local office number XXXX, as shown in FIG. 3. For example, it is assumed that the numbers approximate to the telephone number entered by the user are XXXX3333, XXXX4444, XXXX5555 and XXXX6666.

The route search processing unit 26 searches for positions corresponding to the four selected telephone numbers from the map data stored in the storage device 3. Then, the route search processing unit 26 sets the position of an intersection, which is formed when straight lines are drawn diagonally from four points corresponding to the four selected telephone numbers, as a destination on the map. The route search processing unit 26 searches for a route from the position of the user's vehicle, which is calculated by the vehicle position measuring unit 25, to the point set as the destination.

Figure 4:
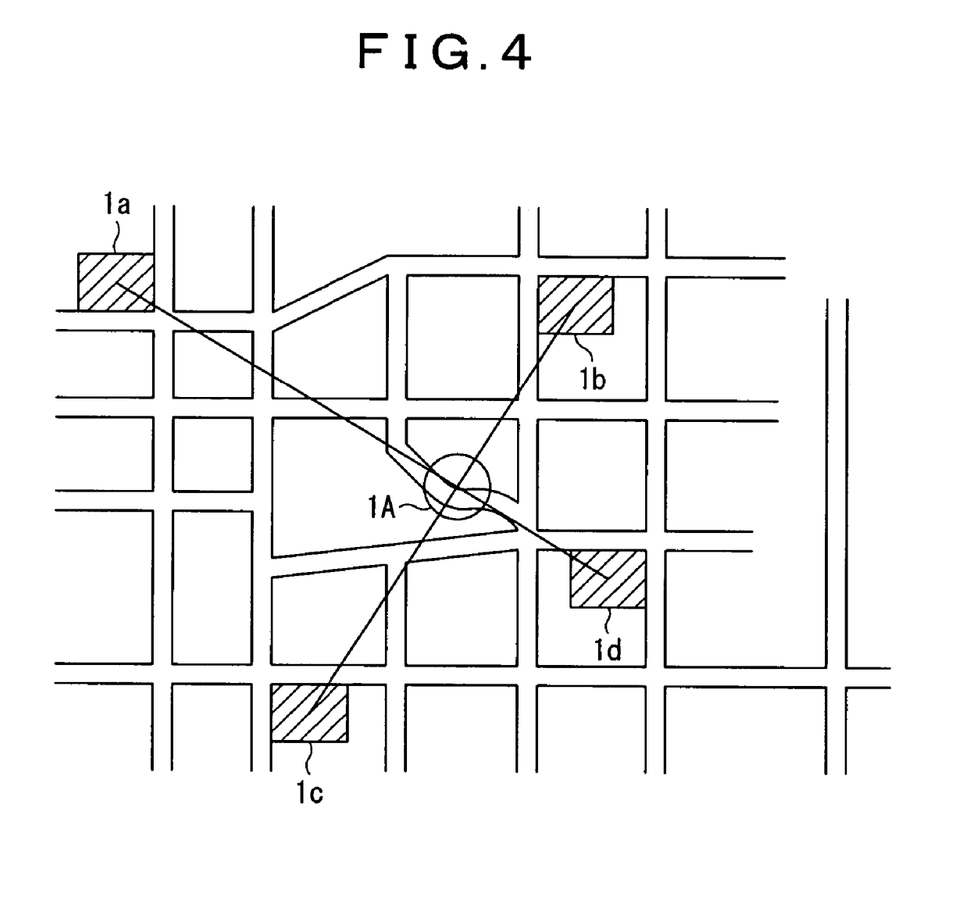
FIG. 4 is an exemplary view displayed on a display 8 when a point of intersection calculated from the four points is set as a destination.

FIG. 4 is the exemplary view displayed on the display 8 when the destination is set by the above-described processing of the route search processing unit 26. For example, when the four points corresponding to the four selected telephone numbers are points 1a, 1b, 1c and 1d, a cursor 1A is displayed at the intersection of a straight line connecting the points 1a and 1d and a straight line connecting the points 1b and 1c. The point displayed by the cursor 1A is set as the destination. Note that the points 1a to 1d and the cursor 1A may be displayed in different display colors, blinking display, 3D display or the like to allow the user to easily identify them. As described, when the position corresponding to the telephone number entered by the user is not stored, four telephone numbers approximate to the entered telephone number are selected, and the intersection formed when the positions corresponding to the selected telephone numbers are connected diagonally with straight lines is set as a destination. Therefore, the user can easily set a point near the original destination as a destination even if the position corresponding to the entered telephone number is not stored.

As described, the route search processing unit 26 sets the position of the intersection, which is formed when straight lines are drawn from the four points corresponding to the four selected telephone numbers, as a destination on the map, but the destination may be set at a point within a predetermined range around the intersection. Specifically, the destination may be set in a range near the intersection. This makes it possible to set a point near the intersection as a destination even if the intersection formed when the straight lines are drawn from the four points is inappropriate as a destination. In this case, a message that the intersection formed when the straight lines are drawn from the four points is inappropriate as a destination may be displayed on the display 8 to notify the user of such a situation. The user may set a point near the intersection as a destination by using the remote controller 5, or the route search processing unit 26 may automatically set an appropriate point as the destination from among points located near the intersection.

The telephone numbers approximate to the telephone number entered by the user are not displayed to the user. In addition, only the cursor 1A may be displayed on the display 8 without displaying the points 1a to 1d.

Figure 5:
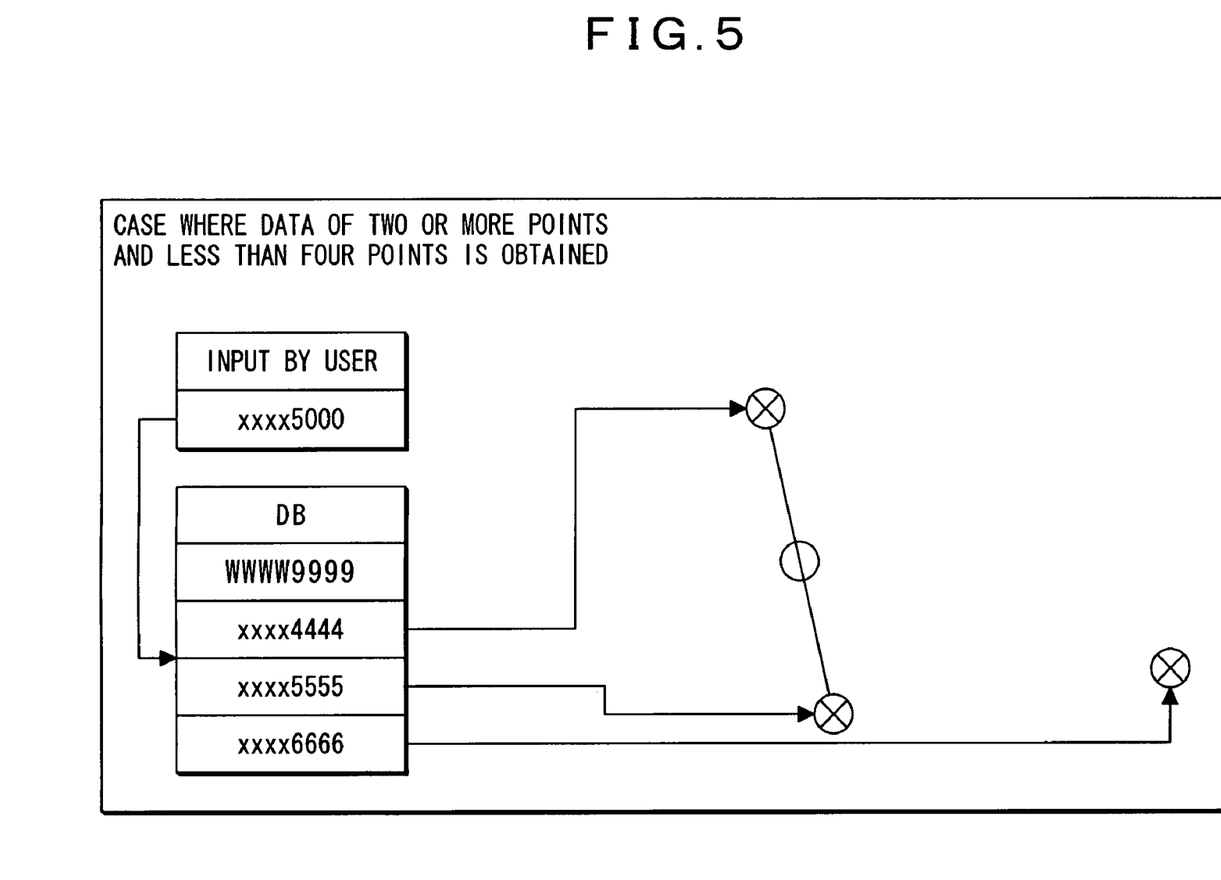
FIG. 5 is an explanatory view of a process of setting a destination for searching a route in the case where positions corresponding to telephone numbers that match the number expressing the area of an entered telephone number are two or more and less than four.

Next, a description will be made of the process of setting a destination to search for a route in the case where positions corresponding to telephone numbers that match the number expressing the area of an entered telephone number are two or more and less than four. FIG. 5 illustrates the processing.

Similar to the above-described case, the user enters the telephone number XXXX5000 by using the remote controller 5. Additionally, the case is considered where positions corresponding to telephone numbers that match the number expressing the area code and the local office number of the entered telephone number are three. For example, it is assumed that the telephone numbers approximate to the telephone number entered by the user are XXXX4444, XXXX5555 and XXXX6666. Note that WWWW9999 is not used as data in setting a destination because it has a different local office number from the telephone number XXXX5000 entered by the user.

The route search processing unit 26 searches for a position corresponding to the entered telephone number from the map data stored in the storage device 3. Since a position corresponding to the entered telephone number is not stored in the storage device 3, two telephone numbers approximate to the telephone number entered by the user are selected out of telephone numbers that match the local number XXXX. In this case, XXXX4444 and XXXX5555, which are approximate to the entered telephone number XXXX5000, are selected.

The route search processing unit 26 sets the central point, which is formed at the center when the positions corresponding to the two selected telephone numbers are connected by a straight line, as a destination. Note that the position corresponding to XXXX6666 is not used in the processing of this case. In other words, the two telephone numbers that are closest to the entered telephone number may be used.

Figure 6:
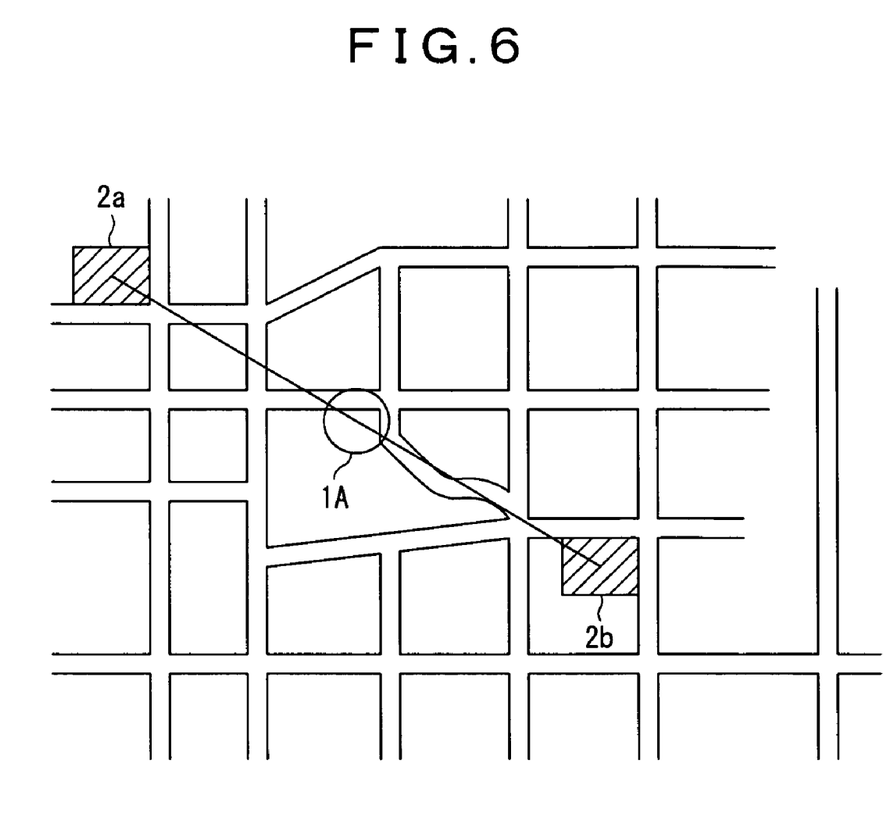
FIG. 6 is an exemplary view displayed on the display 8 when a central point of a straight line connecting two points is set as a destination.

FIG. 6 is the exemplary view displayed on the display 8 when the destination is set by the above-described processing of the route search processing unit 26. For example, when points corresponding to the two selected telephone numbers are point 2a and point 2b, the cursor 1A is displayed at the center on a straight line connecting the point 2a and the point 2b, and thus the destination is set. The points (2a, 2b) and the cursor 1A may be displayed in different display colors, blinking display, 3D display or the like to allow the user to easily identify them.

As described, when the position corresponding to the telephone number entered by the user is not stored and positions corresponding to the telephone numbers that match the number expressing the area of the entered telephone number are two or more and less than four, the central point, which is formed when positions corresponding to the selected telephone numbers are connected by a straight line, is set as a destination. Therefore, the user can easily set a point near the original destination as a destination even when the position corresponding to the telephone number entered by the user is not stored and positions corresponding to the telephone numbers that match the number expressing the area of the entered telephone number are two or more and less than four.

Although the route search processing unit 26 sets the central point, which is formed when positions corresponding to the two selected telephone numbers are connected by a straight line, as a destination, it may set the destination at a point within a predetermined range from the center. In other words, it may set the destination within a range near the center. This makes it possible to set a point near the central point as a destination even if the central point, which is formed when the two points are connected by a straight line, is inappropriate as a destination. In this case, similar to the case described above, a message that the central point, which is formed when the two points are connected by the straight line, is inappropriate as a destination may be displayed on the display 8 to notify the user of such a situation. The user may set a point near the central point, which is formed when the two points are connected by the straight line, as a destination by using the remote controller 5, or the route search processing unit 26 may automatically set an appropriate point from among points nearby the central point as the destination.

The telephone numbers approximate to the telephone number entered by the user are not displayed to the user in this case as well. In addition, only the cursor 1A may be displayed on the display 8 without displaying the points 2a, 2b.

Figure 7:
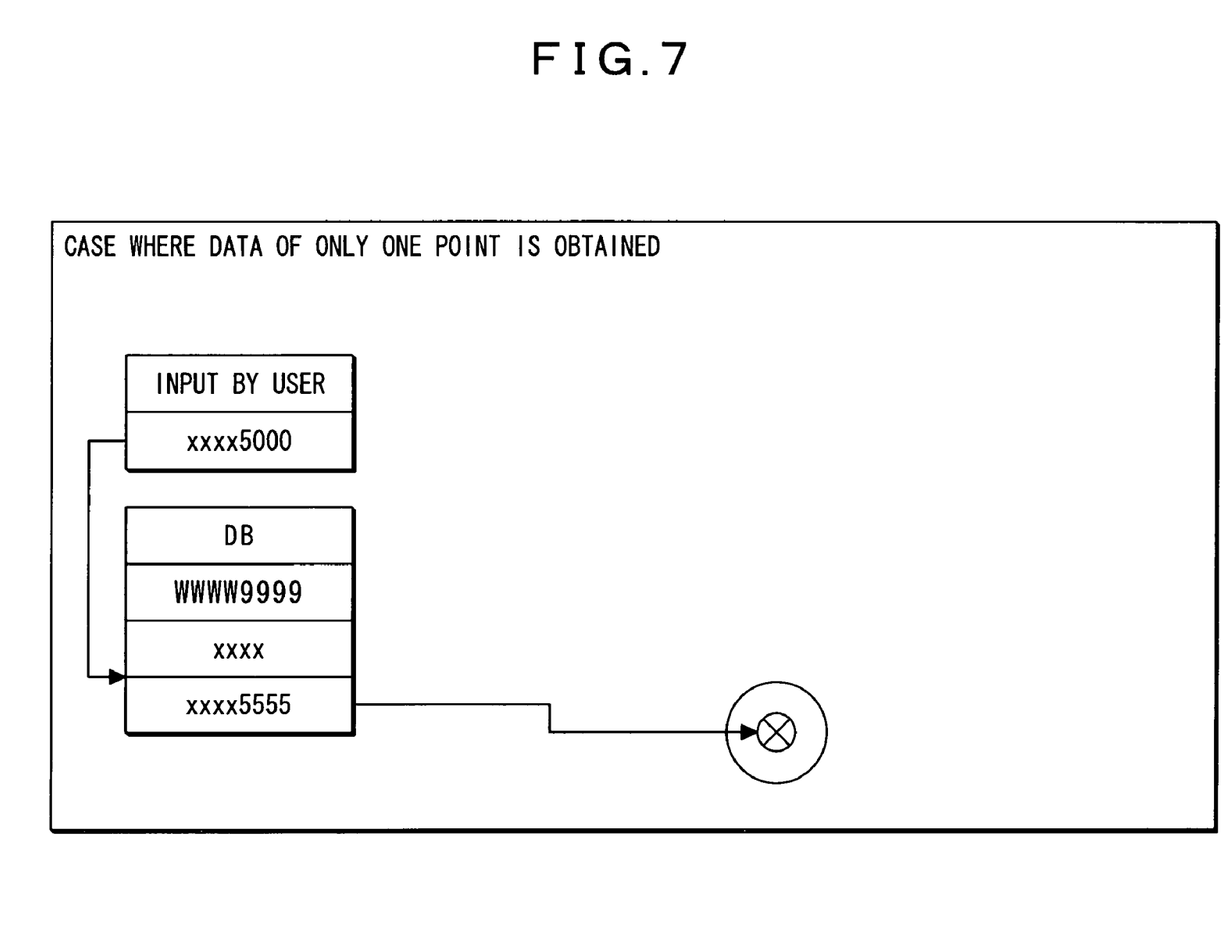
FIG. 7 is an explanatory view of a process of setting a destination for searching a route in the case where only one telephone number matches the number expressing the area of the entered telephone number.

Next, a description will be made of the process of setting a destination to search a route in the case where only one telephone number matches the number expressing the area of an entered telephone number.

FIG. 7 illustrates the process of setting a destination to search for a route in the case where only one telephone number matches the number expressing the area of the entered telephone number. Similar to the above-described case, the user enters the telephone number XXXX5000 by using the remote controller 5. When only XXXX5555 matches the number expressing the area of the entered telephone number, the route search processing unit 26 sets a position corresponding to the number as a destination. Note that WWWW9999 is not used as data in setting a destination because it has a different local office number from the telephone number XXXX5000 entered by the user. Additionally, data of a representative point corresponding to the local office number XXXX is not used.

Figure 8:
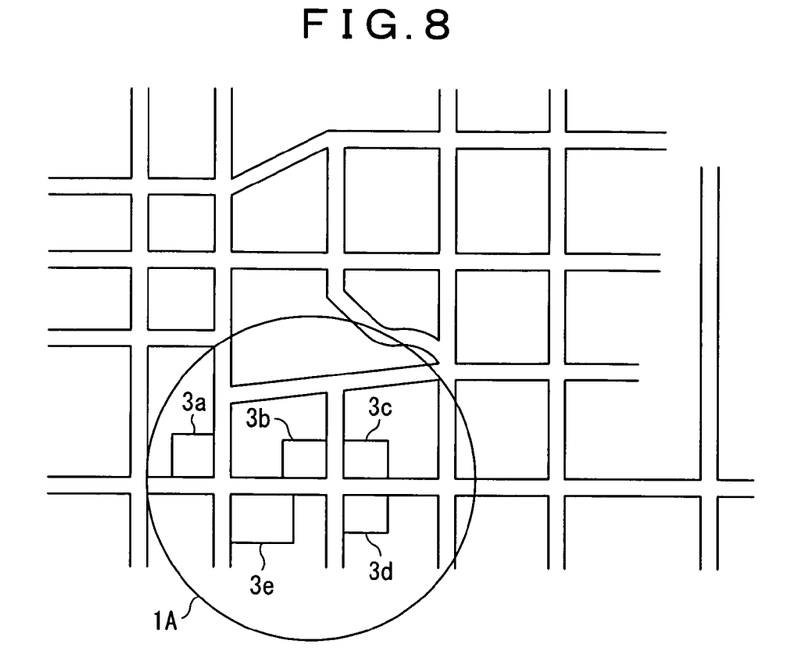
FIG. 8 is an exemplary view displayed on the display 8 when one point is set as a destination.

FIG. 8 is the exemplary view displayed on the display 8 in the above-described case. As shown, even when a position corresponding to the telephone number entered by the user is not stored and only one telephone number matches the number expressing the area of the entered telephone number, the position corresponding to the telephone number is set as a destination. Therefore, the user can easily set a point near the original destination as a destination even if only one telephone number matches the number expressing the area of the entered telephone number.

As shown in FIG. 8, a predetermined range including the position corresponding to XXXX5555 is displayed on the display 8 such that the cursor includes the range. In other words, unlike the case where positions corresponding to telephone numbers that match a number expressing the area of an entered telephone number are four or more or the case where the positions are two or more and less than four, the set destination is displayed generally on the map by enlarging the cursor 1A. As shown in FIG. 8, by displaying the enlarged cursor 1A so as to include points 3a to 3e, a private home is prevented from being specifically identified if the position corresponding to the telephone number approximate to XXXX5000 entered by the user is a private home.

Next, a description will be made of the processing when the destination set by the route search processing unit 26 is inappropriate.

If the destination initially set by the route search processing unit 26 is a river, pond, lake, sea or the like, the route search processing unit 26 resets a destination on dry land near the initially set destination. In other words, if the initially set destination is a point that is physically inaccessible by a vehicle, the route search processing unit 26 resets a nearby point as a destination. In the case of setting a destination from positions corresponding to telephone numbers that match a number expressing the area of a telephone number entered by the user, the destination might initially be set on a river, lake, sea or the like that is inaccessible by a vehicle. In such a case, the route search processing unit 26 resets the destination at an accessible point.

Figure 9:
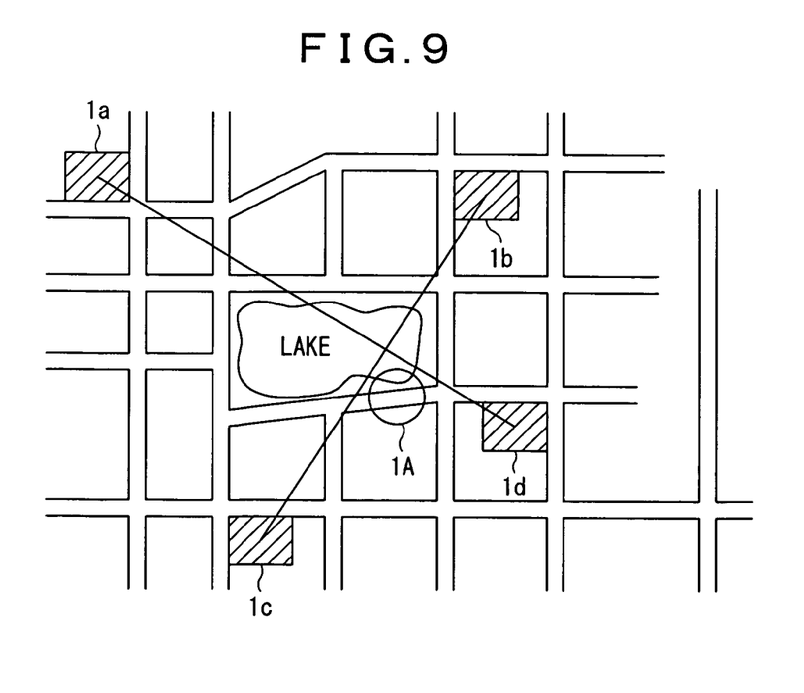
FIG. 9 is an exemplary view displayed on the display 8 when the destination is reset on an accessible point of dry land.

FIG. 9 is an exemplary view displayed on the display 8 when the destination is reset on an accessible point of dry land. FIG. 9 shows the case where the point of intersection is a lake when the point of intersection, which is formed when the four points 1a to 1d are connected by straight lines, is set as a destination. As shown in FIG. 9, by displaying the cursor 1A on a road near the lake and resetting the point as the destination, the route search processing unit 26 can search for a route to the reset destination.

In resetting a destination performed by the route search processing unit 26, the user may be allowed to reset the destination by using the remote controller 5 or the route search processing unit 26 may automatically reset a point, which is near the initially set destination and accessible by a vehicle, as the destination.

Figure 10:
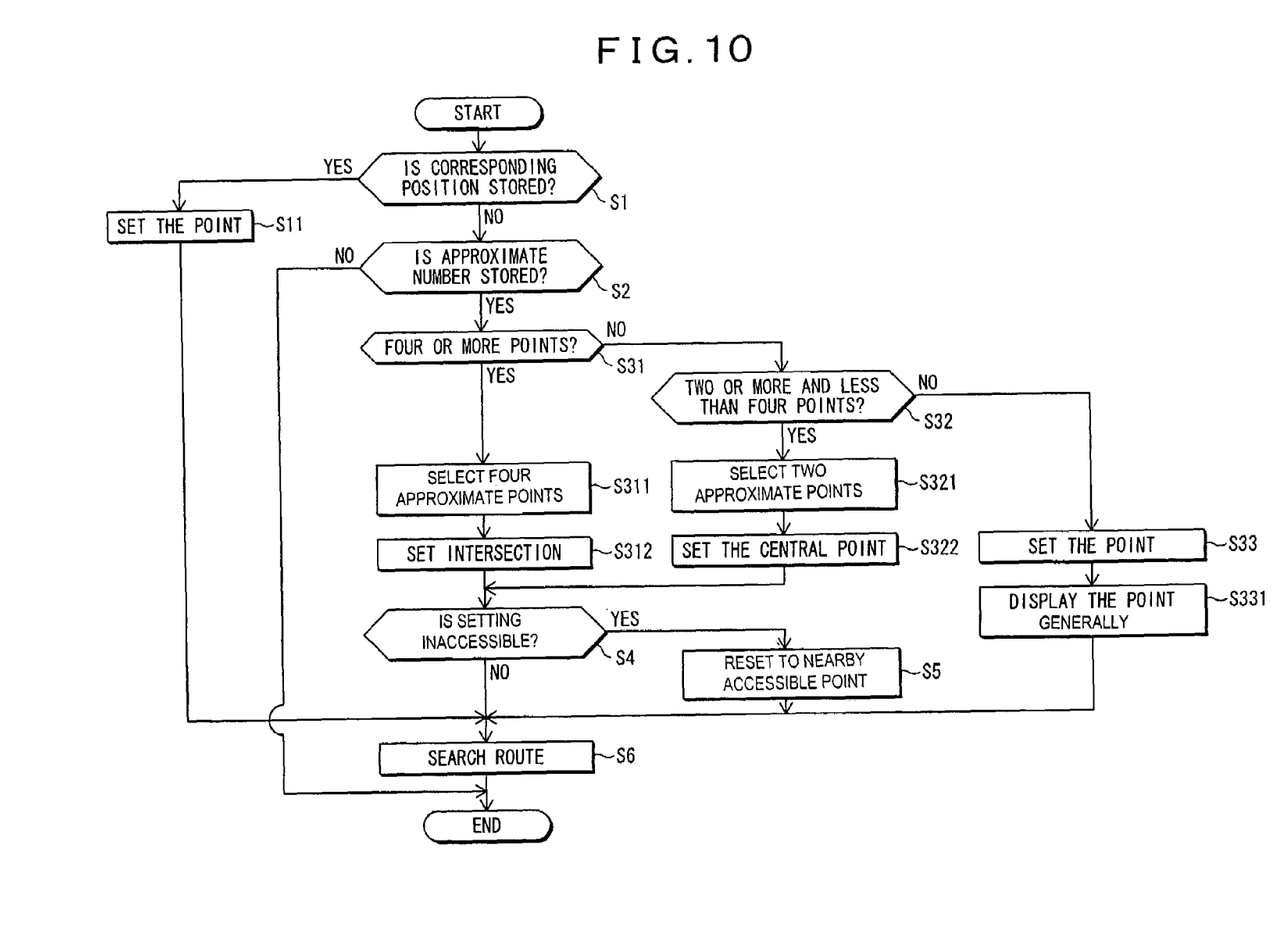
FIG. 10 is a processing flowchart of a route search of the navigation system 1.

Next, the route search processing of the navigation system 1 will be described. FIG. 10 is the processing flowchart of the route search of the navigation system 1. The processing shown in FIG. 10 starts by turning a power source ON and ends by turning the power source OFF. Turning ON and OFF the power source is executed either by turning the power source of the navigation system 1 ON/OFF or turning ON/OFF an engine-starting key (ignition switch) of a vehicle.

The user enters the telephone number of a destination by using the remote controller 5. When the telephone number is entered, the route search processing unit 26 searches for a position corresponding to the entered telephone number from the storage device 3 (step S1). When a position corresponding to the entered telephone number is stored (Yes in step S1), the unit sets the point as a destination (step S11), and searches for a route to the set destination from the present position calculated by the vehicle position calculation unit 25 (step S6). After the route search, the route is communicated to the user by displaying it on the display 8.

If a position corresponding to the entered telephone number is not stored (No in step S1), the route search processing unit 26 determines whether or not positions corresponding to telephone numbers that match a number expressing the area of the entered telephone number are stored in the storage device 3 (step S2). If positions corresponding to telephone numbers that match a number expressing the area of the entered telephone number are not stored (No in step S2), the route search processing unit 26 ends processing without setting a destination and searching for a route.

When positions corresponding to telephone numbers that match a number expressing the area of the entered telephone number are stored (Yes in step S2), the route search processing unit 26 determines whether or not the corresponding points are four or more (step S31).

When positions corresponding to telephone numbers that match a number expressing the area of the entered telephone number are four or more (Yes in step S31), the route search processing unit 26 selects four telephone numbers approximate to the entered telephone number from among the telephone numbers that match a number expressing the area of the entered telephone number (step S311).

The route search processing unit 26 sets an intersection, which is formed when the positions corresponding to the four selected telephone numbers are connected diagonally by straight lines, as a destination (step S312). Next, the route search processing unit 26 determines whether or not the set destination is inappropriate as a destination (step S4). In other words, the route search processing unit 26 determines whether or not the set destination is a river, lake, sea or the like.

When the set destination is not inappropriate, that is, when the set destination is not a river, lake, sea or the like (No in step S4), the route search processing unit 26 searches for a route from the present position to the set destination (step S6) and ends the processing.

If the set destination is inappropriate, that is, if the initially set destination is a river, lake, sea or the like (Yes in step S4), the route search processing unit 26 resets the destination to an accessible point, such as on dry land near the destination initially set (step S5). Alternatively, the user may reset the destination directly by using the remote controller 5. Next, the route search processing unit 26 searches for a route from the present position to the reset destination (step S6).

If positions corresponding to telephone numbers that match a number expressing the area of the telephone number entered by the user are not four or more (No in step S31), the route search processing unit 26 determines whether or not the positions corresponding to telephone numbers that match a number expressing the area of the entered telephone number are two or more and less than four (step S32).

When the positions corresponding to telephone numbers that match a number expressing the area of the entered telephone number are two or more and less than four (Yes in step S32), that is, when the positions corresponding to telephone numbers that match a number expressing the area of the entered telephone number are two or three, the route search processing unit 26 selects two telephone numbers approximate to the entered telephone number from the telephone numbers that match a number expressing the area of the entered telephone number (step S321).

Next, the route search processing unit 26 sets the central point, which is formed at the center when positions corresponding to the selected two telephone numbers are connected by a straight line, as a destination (step S322). After that, the route search processing unit 26 determines whether or not the set destination is inappropriate as a destination (step S4) similar to the above-described case. When it is not inappropriate as a destination (No in step S4), the route search processing unit 26 searches for a route from the present position to the set destination (step S6) and ends the processing. If the initially set destination is inappropriate (Yes in step S4), the route search processing unit 26 resets the destination to an accessible point, such as on dry land near the destination initially set (step S5), searches for a route from the present position to the reset destination (step S6), and ends the processing.

When the positions corresponding to telephone numbers that match a number expressing the area of the entered telephone number are not two or more and less than four (No in step S32), that is, when only one telephone number matches a number expressing the area of the entered telephone number, the unit selects the telephone number and sets a position corresponding to the telephone number as a destination (step S33). In this setting, the route search processing unit 26 displays a predetermined range including the position corresponding to the telephone number generally on the map (step S331). Next, the route search processing unit 26 searches for a route from the present position to the set destination (step S6) and ends the processing.

Note that the route search method according to the present invention can be realized by using a CPU (Central Processing Unit), a ROM (Read Only Memory), a RAM (Random Access Memory) or the like, a program installed from a hard disk drive, a CD-ROM, a DVD, portable storage medium such as a flexible disk or the like, or is downloaded from a communication circuit, and the CPU executes the program to realize the processing.

Consequently, the navigation system, the route search method and the storage medium, which are capable of easily setting a destination even if a telephone number that is not contained in a storage device is entered, can be provided.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation system comprising:
   a storage unit that stores map data including positions corresponding to telephone numbers; and
   a route search processing unit that sets a destination, wherein in the case where a position corresponding to a telephone number entered by a user is not stored in said storage unit and positions corresponding to one or more telephone numbers that match a number expressing the area of said entered telephone number are stored in said storage unit, the route search processing unit selects a predetermined number of telephone numbers that match the number expressing the area of said entered telephone number, and sets a destination based on positions corresponding to said selected telephone numbers to search for a route.

2. The navigation system according to claim 1, wherein in the case where positions corresponding to the telephone numbers that match the number expressing the area of said entered telephone number are four or more, said route search processing unit selects four of said telephone numbers and sets the point of intersection, which is formed when the positions corresponding to said telephone numbers are connected diagonally by straight lines, as a destination.

3. The navigation system according to claim 1, wherein in the case where positions corresponding to the telephone numbers that match the number expressing the area of said entered telephone number are two or more and less than four, said route search processing unit selects two of said telephone numbers and sets a central point, which is formed at the center when the positions corresponding to said telephone numbers are connected by a straight line, as a destination.

4. The navigation system according to claim 1, wherein in the case where only one telephone number matches the number expressing the area of said entered telephone number, said route search processing unit selects the telephone number and sets a position corresponding to the telephone number as a destination.

5. The navigation system according to claim 4, further comprising:
   a display unit that displays a cursor, which indicates a predetermined range including a destination set by said route search processing unit, on said map data.

6. The navigation system according to claim 1, wherein in the case where a set destination is an inappropriate point, said route search processing unit resets a nearby appropriate point as a destination.

7. The navigation system according to claim 6, wherein said inappropriate point is an inaccessible point.

8. The navigation system according to claim 1, wherein said selected telephone numbers are telephone numbers approximate to said entered telephone number.

9. The navigation system according to claim 1, wherein the number expressing said area is an office number.

10. A route search method comprising:
    storing map data including positions corresponding to telephone numbers; and
    selecting a predetermined number of telephone numbers that match a number expressing the area of a telephone number entered by a user when a position corresponding to said entered telephone number is not stored and positions corresponding to one or more telephone numbers that match the number expressing the area of said entered telephone number are stored, and setting a destination based on positions corresponding to said selected telephone numbers to search for a route.

11. The route search method according to claim 10, wherein
in the case where positions corresponding to the telephone numbers that match the area of said entered telephone number are four or more, four of said telephone numbers are selected, and the point of intersection, which is formed when the positions corresponding to said telephone numbers are connected diagonally by straight lines, is set as a destination.

12. The route search method according to claim 10, wherein
in the case where positions corresponding to the telephone numbers that match the number expressing the area of said entered telephone number are two or more and less than four, two of said telephone numbers are selected, and a central point, which is formed at the center when the positions corresponding to said telephone numbers are connected by a straight line, is set as a destination.

13. The route search method according to claim 10, wherein
in the case where only one telephone number that matches the number expressing the area of said entered telephone number, the telephone number is selected and a position corresponding to the telephone number is set as a destination.

14. The route search method according to claim 13, further comprising displaying a cursor, which indicates a predetermined range including a destination set by said route search method, on said map data.

15. The route search method according to claim 10, wherein
said selected telephone numbers are telephone numbers approximate to said entered telephone number.

16. The route search method according to claim 10, wherein
in the case where a set destination is an inappropriate point, said route search processing unit resets a nearby appropriate point as a destination.

17. The route search method according to claim 16, wherein
said inappropriate point is an inaccessible point.

18. The route search method according to claim 10, wherein
the number expressing said area is an office number.

19. A computer readable storage medium storing a program for executing the route search method according to claim 10.

* * * * *

UNITED STATES PATENT AND TRADEMARK OFFICE
CERTIFICATE OF CORRECTION

| | | |
|---|---|---|
| PATENT NO. | : 7,647,167 B2 | Page 1 of 1 |
| APPLICATION NO. | : 11/406052 | |
| DATED | : January 12, 2010 | |
| INVENTOR(S) | : Iwao Yamakage | |

It is certified that error appears in the above-identified patent and that said Letters Patent is hereby corrected as shown below:

On the Title Page

Item (73), replace "Apline" with --Alpine--.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,167 B2 | Page 1 of 1 |
| APPLICATION NO. | : 11/406052 | |
| DATED | : January 12, 2010 | |
| INVENTOR(S) | : Iwao Yamakage | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 939 days.

Signed and Sealed this

Twenty-second Day of June, 2010

David J. Kappos
*Director of the United States Patent and Trademark Office*